US008193969B2

(12) United States Patent
Varadarajan et al.

(10) Patent No.: US 8,193,969 B2
(45) Date of Patent: Jun. 5, 2012

(54) METHOD AND SYSTEM FOR MAINTAINING SPATIO-TEMPORAL DATA

(75) Inventors: Srivatsan Varadarajan, Minneapolis, MN (US); Vicraj T. Thomas, Golden Valley, MN (US); James A. Freebersyser, Chanhassen, MN (US)

(73) Assignee: Honeywell International Inc., Morristown, NJ (US)

( * ) Notice: Subject to any disclaimer, the term of this patent is extended or adjusted under 35 U.S.C. 154(b) by 90 days.

(21) Appl. No.: 12/769,145

(22) Filed: Apr. 28, 2010

(65) Prior Publication Data

US 2010/0211306 A1 Aug. 19, 2010

Related U.S. Application Data

(62) Division of application No. 11/715,208, filed on Mar. 7, 2007, now Pat. No. 7,728,758.

(51) Int. Cl.
*G01S 13/95* (2006.01)

(52) U.S. Cl. .................................... 342/26 B; 342/26 R

(58) Field of Classification Search .................... 342/26, 342/29, 36; 701/200
See application file for complete search history.

(56) References Cited

U.S. PATENT DOCUMENTS 4,764,769 A 8/1988 Hayworth et al.
5,583,505 A 12/1996 Andersen et al.
5,636,123 A * 6/1997 Rich et al. .................... 701/207
5,719,582 A 2/1998 Gray
5,966,091 A 10/1999 Andersson
6,014,606 A 1/2000 Tu
6,043,756 A 3/2000 Bateman et al.
6,380,869 B1 * 4/2002 Simon et al. ................. 340/945
6,407,697 B1 6/2002 Hager et al.
6,441,773 B1 8/2002 Kelly et al.
6,650,972 B1 * 11/2003 Robinson et al. ................ 701/3
6,671,310 B1 12/2003 Richards et al.
6,778,603 B1 8/2004 Fullerton et al.
6,847,675 B2 1/2005 Fullerton et al.
6,879,280 B1 4/2005 Bull et al.
6,937,639 B2 8/2005 Pendergrass et al.
6,977,608 B1 12/2005 Anderson et al.
7,034,738 B1 4/2006 Wang et al.
7,082,172 B1 7/2006 Pringle et al.
7,109,912 B1 9/2006 Paramore et al.
7,109,913 B1 9/2006 Paramore et al.
7,486,221 B2 2/2009 Meyers et al.
7,522,088 B2 * 4/2009 Barry et al. .................... 342/29
2003/0043934 A1 3/2003 Roberts

* cited by examiner

*Primary Examiner* — Ian Lobo
(74) *Attorney, Agent, or Firm* — Fogg & Powers LLC

(57) ABSTRACT

A system and method for maintaining spatio-temporal data for a given area (e.g., an airspace) containing a given node (e.g., an aircraft) and one or more other nodes (e.g., aircraft). The given aircraft may break the given airspace into a first plurality of smaller airspaces, and may also break the given airspace into a second plurality of smaller airspaces. The given aircraft may then detect local spatio-temporal data for each smaller airspace located within its detectable range. The aircraft may also receive remote spatio-temporal data for the smaller airspaces from the one or more other aircraft. Thereafter, the aircraft may update stored spatio-temporal data based on the aircraft's navigation data, the local spatio-temporal data, the remote spatio-temporal data, and/or a reliability of the data. Further, the aircraft may transmit the stored spatio-temporal data for receipt by the one or more other aircraft.

23 Claims, 6 Drawing Sheets

METHOD AND SYSTEM FOR MAINTAINING SPATIO-TEMPORAL DATA

CROSS-REFERENCE TO RELATED APPLICATIONS

This application is a divisional of U.S. application Ser. No. 11/715,208, filed Mar. 7, 2007, which is incorporated herein by reference.

FIELD

The present invention relates generally to detecting and maintaining spatio-temporal data, and more particularly to detecting and maintaining airspace hazard data.

BACKGROUND

In today's fast moving world, there is a desire for reliable, real-time spatio-temporal data (i.e., data relating to space and/or time) in a variety of scenarios. For example, vehicles (e.g., automobiles, aircrafts) may desire spatio-temporal data related to their future travels, such as the presence of airspace or roadway hazards and/or traffic. Other examples are possible as well.

Hazardous airspace conditions (e.g., inclement weather) may especially be relevant to aircrafts, because the hazards may present a variety of problems for aircraft. For example, inclement weather may damage an aircraft, jeopardize the safety of aircraft operators and passengers, and/or increase fuel costs. As such, in-flight aircraft need the ability to detect and/or obtain real-time hazard information to avoid the hazardous conditions.

Aircraft traditionally use on-board radar systems as one method for detecting and avoiding hazardous airspace conditions, such as inclement weather. On-board radar systems typically provide aircraft operators with a visual representation of hazards relative to the aircraft's position. However, the hazard detection range of a radar system in a typical aircraft is limited by inherent hardware characteristics (e.g., power, reflectance, attenuation). For example, an aircraft radar system may only be capable of detecting hazards over a range of 200 miles, and sometimes much less depending on current hazard conditions.

Aircraft may also obtain hazard information from ground-based radar systems. These ground-based radar systems may periodically collect airspace hazard information from various sources and then communicate the hazard information to aircraft. However, hazard information from these ground-based radar systems may suffer from high latency and may also be available only over land. Accordingly, there is a need for a spatio-temporal data detection system that provides reliable, real-time hazard information over a larger airspace range.

SUMMARY

An improved system and method for maintaining spatio-temporal data (e.g., airspace hazard data) for a given area is described.

One example of the present invention may take the form of a method for maintaining spatio-temporal data for a given area containing a given node that may communicate with one or more other nodes. In a preferred example, the given area will be an airspace and the nodes will be aircraft. According to that method, the given aircraft may first break the given airspace into a first plurality of smaller airspaces (i.e. a first level of sub-airspaces). The given aircraft may also break the given airspace into a second plurality of smaller airspaces (i.e. a second level of sub-airspaces), each of which contains two or more adjacent first level sub-airspaces. The given aircraft may also assign each of the sub-airspaces one or more identifiers, which may identify the location and/or level of the sub-airspace, and the given aircraft may store the identifier as stored spatio-temporal data.

After breaking the given airspace into sub-airspaces, the given aircraft may detect local spatio-temporal data for each of the sub-airspaces located within its detectable range, which is the range for which the given aircraft is capable of detecting spatio-temporal data. The given aircraft may also receive remote spatio-temporal data from the one or more other aircraft in the given airspace. The received remote spatio-temporal data may be for sub-airspaces both inside and outside of the given aircraft's detectable range, thus providing the given aircraft with a broader view of the given airspace.

The given aircraft may then update stored spatio-temporal data. For example, the given aircraft may update the stored hazard data based on (i) navigation data for the given aircraft, (ii) detected local hazard data for the sub-airspaces within the aircraft's detectable range, (iii) remote hazard data received from one or more other aircraft, and/or (iv) reliability of the stored hazard data (e.g., amount of time since the last update, continuity of a hazard, etc.). Further, the given aircraft may update the stored hazard data for the second level sub-airspaces based on the stored hazard data for the first level sub-airspaces.

The given aircraft may also order the stored spatio-temporal data for the sub-airspaces to correspond to an identity of the sub-airspaces. For example, the given aircraft may order the stored spatio-temporal data for the sub-airspaces based on the location of the sub-airspaces. In this respect, the given aircraft may also separate the stored spatio-temporal data for sub-airspaces behind the given aircraft from the stored spatio-temporal data for sub-airspaces ahead of the given aircraft. As another example, the given aircraft may order the stored spatio-temporal data for the sub-airspaces based on the level of the sub-airspaces. In this respect, the given aircraft may also separate the stored spatio-temporal data for sub-airspaces in different levels of the given airspace.

The given aircraft may further transmit the stored spatio-temporal data for receipt by the one or more other aircraft. For example, the given aircraft may transmit all stored spatio-temporal data. As another example, the given aircraft may transmit the stored spatio-temporal data for a given sub-airspace if the stored spatio-temporal data indicates a presence of a hazard for the given sub-airspace. As yet another example, the given aircraft may transmit the stored spatio-temporal data for a given sub-airspace if the given aircraft has updated the stored spatio-temporal data for the given smaller airspace since the last transmission of the stored spatio-temporal data. As still another example, the given aircraft may define a transmit region of the given airspace (e.g., a region behind and in front of the given aircraft), and the given aircraft may then transmit the stored spatio-temporal data for each sub-airspace located within the transmit region. As a further example, the given aircraft may transmit the stored spatio-temporal data for the second level sub-airspaces according to a first probability and transmit the stored spatio-temporal data for the first level sub-airspaces according to a second probability.

Along with the stored spatio-temporal data, the given aircraft may also transmit its current navigation data, in which case the given aircraft may first determine its current navigation data (e.g., via a navigation system of the aircraft). The receiving aircraft may then use the navigation data and the sub-airspace identifiers in the stored spatio-temporal data to determine the location of hazards.

The given aircraft may additionally provide a user of the given aircraft with the stored spatio-temporal data. For example, the given aircraft may provide the user with a graphical display or audio notifications representing the stored spatio-temporal data.

Another example of the present invention may take the form of an aircraft radar system for maintaining airspace hazard data in a given airspace. The aircraft radar system may include (i) airspace detection equipment, (ii) a communication interface for engaging in communications with one or more other radar systems, (iii) a navigation system interface for communicating with an aircraft navigation system, (iv) a user interface, (v) a processor, and (vi) data storage that contains airspace hazard data and program instructions executable by the processor to carry out the functions of the present invention, as described above. The program instructions may comprise an application layer protocol of the Open Systems Interconnection (OSI) network protocol model.

The stored hazard data in data storage may include hazard indicators, sub-airspace identifiers, and/or indicators of hazard data reliability. Further, data storage may comprise a queue structure that includes (i) a first queue with one or more rows that each contain airspace hazard data for a level 1 sub-airspace, (ii) a second queue with one or more rows that each contain airspace hazard data for a level 2 sub-airspace, and (iii) one or more bitwise ORs with an input that connects to two or more rows of the first queue and an output that connects to a single row of the second queue. Further yet, data storage may contain a first and second queue structure as described, with the first queue structure containing airspace hazard data for a region located behind the aircraft radar system and the second queue structure containing airspace hazard data for a region located ahead of the aircraft radar system These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred examples are described below in conjunction with the appended drawing figures, wherein like reference numerals refer to like elements in the various figures, and wherein.

DETAILED DESCRIPTION

Figure 1:
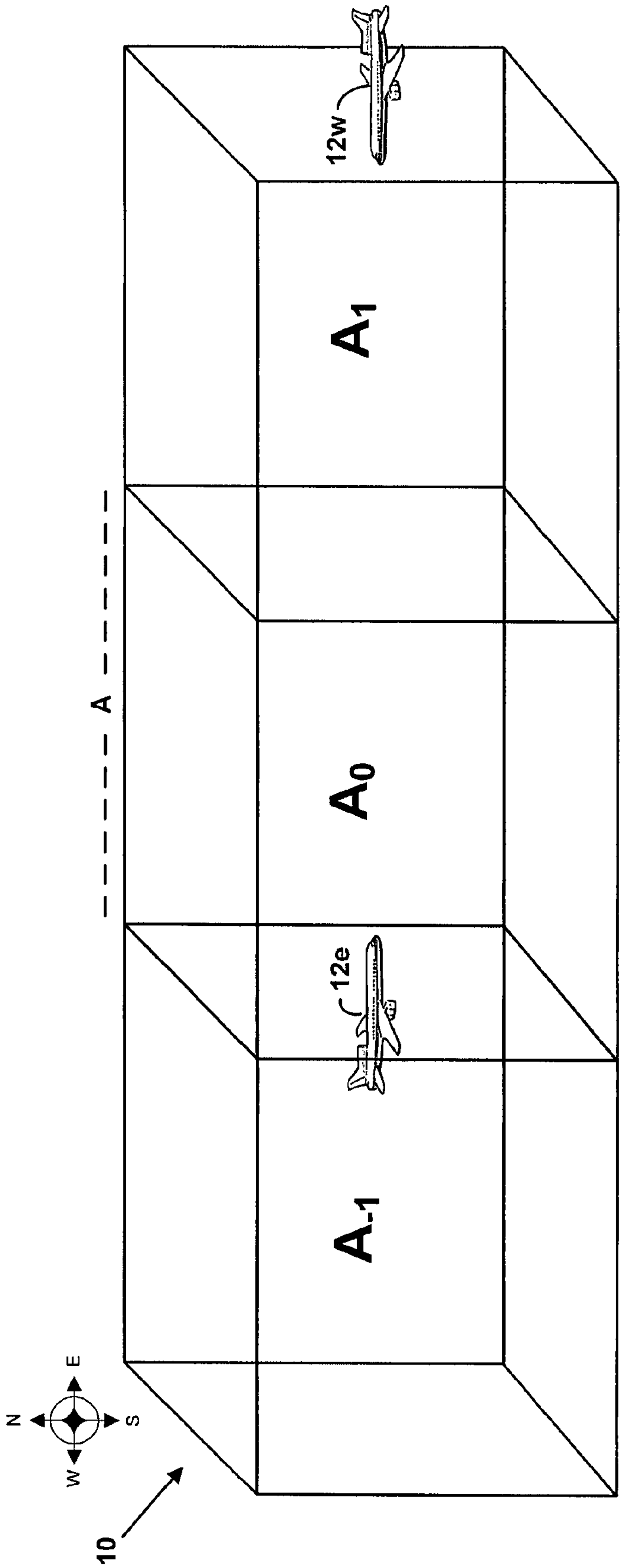
FIG. 1 is a diagram of an airspace, according to an example of the present invention.

The present invention may take the form of a method and system for maintaining spatio-temporal data in a given area, and may be carried out by various nodes (e.g., aircrafts, automobiles, fixed nodes, etc.) within the given area that are capable of detecting and communicating spatio-temporal data. In a preferred example, the present invention will be carried out by aircrafts within a given airspace. As such, referring to the drawings, FIG. 1 is a diagram of aircrafts 12 within an airspace 10, according to an example of the present invention. As shown, within the airspace 10 there may be an aircraft **12*e* traveling east-bound and an aircraft 12*w* traveling west-bound. Further, the airspace 10** may include multiple smaller airspaces (i.e., sub-airspaces) of volume of $A^3$, such as sub-airspace $A_{-1}$, sub-airspace $A_0$, and sub-airspace $A_1$.

It should be understood, however, that this and other arrangements described herein are set forth for purposes of example only. As such, those skilled in the art will appreciate that other areas, arrangements, and/or elements (e.g., nodes such as aircrafts, etc.) may exist instead, some elements may be added, and some elements may be omitted altogether. For example, the present invention may instead be carried out by automobiles within a given city. As another example, the present invention may instead be carried out by cellular wireless telephones within a given cell sector. Many other examples are possible as well. Further, the claims should not be read as limited to the described order or elements unless stated to that effect. Therefore, all embodiments that come within the scope and spirit of the appended claims and equivalents thereto are claimed as the invention.

Figure 2:
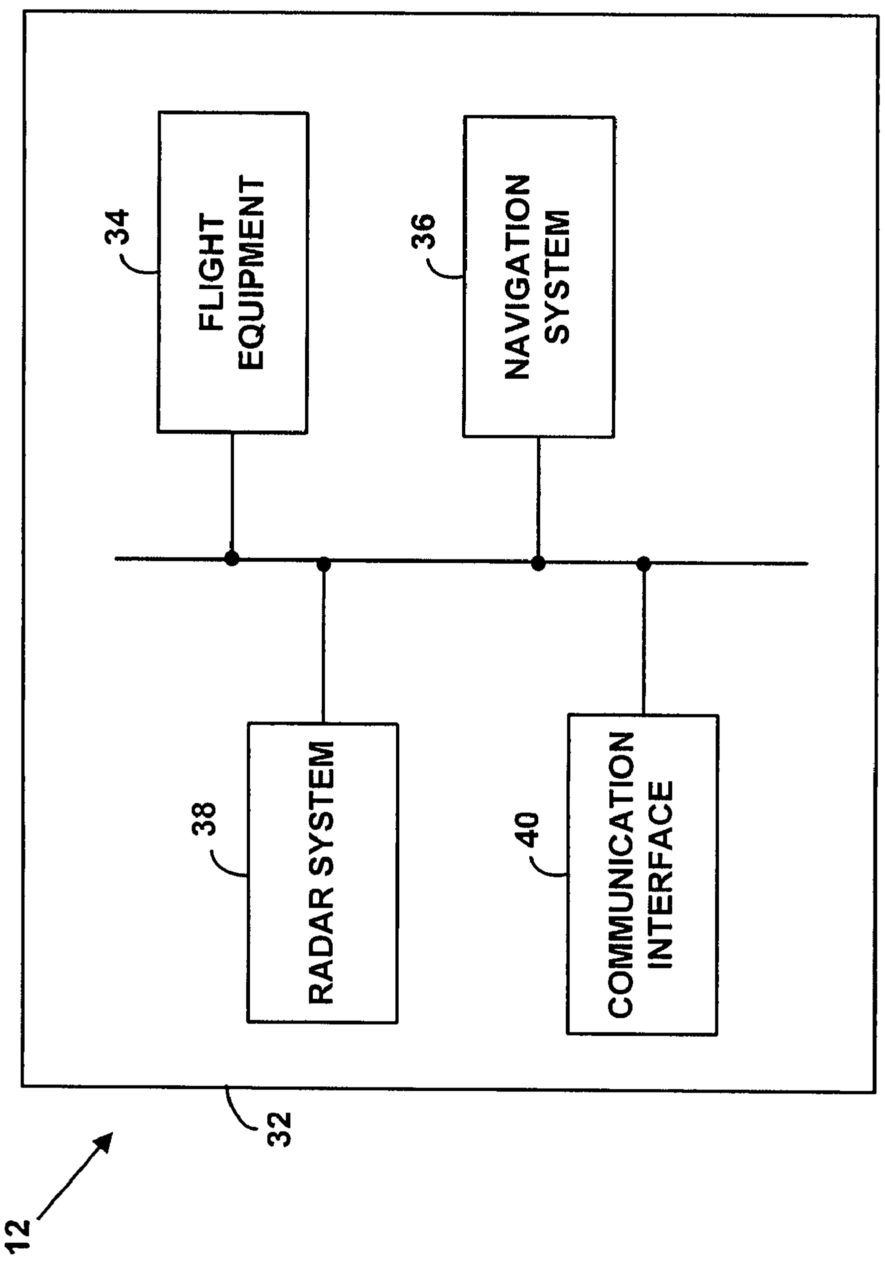
FIG. 2 is a simplified block diagram of an aircraft, according to an example of the present invention.

The east-bound aircraft **12*e* and west-bound aircraft 12*w* may be any machine capable of atmospheric flight, such as an airplane or helicopter. FIG. 2 is a simplified block diagram of an aircraft 12, according to an example of the present invention. As shown in FIG. 2, the aircraft 12 may include, without limitation, flight equipment 34, a navigation system 36, a radar system 38, and a communication interface 40, as well as one or more cabins (not shown), which may house pilots, passengers, equipment, and/or cargo. As shown, the components of the aircraft 12 may be located within a frame 32, but some of these components (or parts thereof) may also be attached to the frame 32** (e.g., wings).

The flight equipment 34 may include various components that facilitate the flight of aircraft 12. For example, flight equipment 34 may include, without limitation, wings (e.g., fixed or rotary), one or more engines, fuel equipment, and/or landing gear. Flight equipment 32 may also include user interfaces for the above components that facilitate pilot interaction with the flight equipment 34.

The navigation system 36 may detect and maintain navigation data (i.e., flight characteristics) for the aircraft 12. For example, the navigation system 36 may detect and maintain the aircraft's coordinates (e.g., latitude, longitude, and altitude), flight direction, flight angle, velocity, and/or acceleration. As such, the navigation system 36 may include various components (e.g., sensors) for detecting flight characteristics, a processor and data storage for detecting, calculating, and/or maintaining flight characteristics, and a user interface that facilitates pilot interaction with the navigation system 36.

The radar system 38 may function to detect and maintain spatio-temporal conditions in a fixed airspace surrounding the aircraft, which may change as the aircraft 12 travels through the atmosphere. The airspace conditions may include air data (e.g., wind, air pressure, and temperature conditions) and hazard information (e.g., presence, location and magnitude of weather hazards, predictive windshear, turbulence, etc.). As such, the radar system may include, without limitation, various components for detecting airspace conditions, a processor and data storage for detecting, calculating, and/or maintaining airspace conditions, and a user interface that facilitates pilot interaction with the radar system 38. As an example, the radar system 38 may be a Primus 880 system that provides weather detection, turbulence detection, a rain echo attenuation compensation technique (REACT), and a target alert.

The communication interface 40 may function to communicatively couple the aircraft 12 to various other nodes, such as other aircraft, ground stations, and/or satellites. As such, the communication interface 40 preferably takes the form of a chipset and antenna adapted to facilitate wireless communication (e.g., voice, data, etc.) according to one or more desired protocols (e.g., VDL Mode 2, etc.). The aircraft 12 may also include multiple communication interfaces, such as one through which the aircraft 12 sends communication and one through which the aircraft 12 receives communication.

In a preferred embodiment, the navigation system 36, the radar system 38, the communication interface 40, and certain flight equipment 34 may be interconnected by a common system bus or other connection mechanism. Further, the navigation system 36, the radar system 38, and the communication interface 40 may share a common processor and/or data storage. Further yet, various components of the aircraft 12 may be integrated together in whole or in part. For example, the communication interface 40 may be integrated in whole or in part with the radar system 38.

Typically, the radar system 38 of the aircraft 12 may only be capable of detecting airspace conditions over a fixed airspace of volume $A^3$ ahead of the aircraft 12 (i.e., the aircraft's detectable range). As such, assuming the aircraft 12*e* and the aircraft 12*w* in FIG. 1 include the functional components described with reference to FIG. 2, the aircraft 12*e* may have a radar system capable of detecting hazards over the sub-airspace $A_0$ of the airspace 10, and aircraft 12*w* may have a radar system capable of detecting hazards over the sub-airspace $A_1$ of the airspace 10. However, if there is a hazard outside of sub-airspace $A_0$, the radar system of aircraft 12*e* may not be able to detect that hazard until aircraft 12*e* flies closer to the hazard. Similarly, if there is a hazard outside of sub-airspace $A_1$, the radar system of aircraft 12*w* may not be able to detect that hazard until aircraft 12*w* flies closer to the hazard. Further, depending on the airspace conditions between the aircraft 12 and the hazard, the on-board radar systems of aircraft 12*e* and 12*w* may not even be able to detect hazards within their otherwise detectable range. As such, a typical radar system 38 may not provide the aircraft 12 enough time to avoid a hazard.

The present invention may improve the range and reliability of an aircraft radar system 38 by communicating airspace conditions (e.g., hazard information) between the two or more aircraft 12 via their communication interfaces 40. Because the transmission range of an aircraft's communication interface 40 is typically greater than the detection range of the aircraft's radar system 38, the present invention may provide the aircraft 12 with airspace condition data over a greater range than a typical radar system 38 can provide. Further, because the aircraft 12 are receiving the airspace condition data from other aircraft, as opposed to ground-based stations, the present invention may provide airspace condition data that has increased availability and lower latency.

Figure 3:
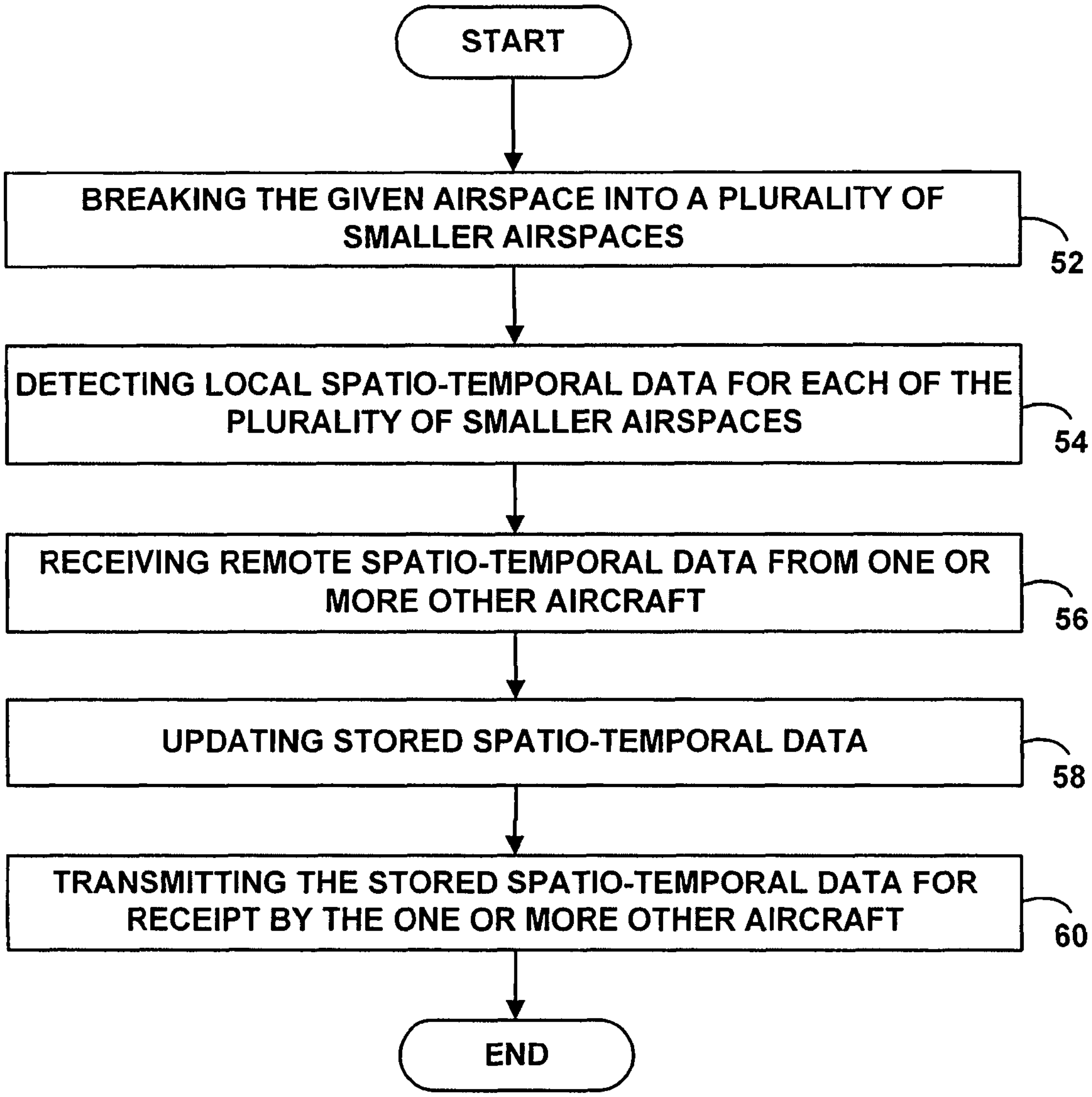
FIG. 3 is a flow chart depicting a method for maintaining spatio-temporal data for a given aircraft and one or more other aircraft located in the airspace of FIG. 1, according to an example of the present invention.

FIG. 3 is a flow chart depicting a method for maintaining spatio-temporal data for the aircraft 12*e* and one or more other aircraft located in the airspace 10, such as the aircraft 12*w*, according to an example of the present invention. For purposes of illustration, the following description will assume that the spatio-temporal data is airspace hazard data. Further, as described with reference to FIG. 1, the following description will assume that the aircraft 12*e* is capable of detecting hazards in its detectable range, the sub-airspace $A_0$, and aircraft 12*w* is capable of detecting hazards in its detectable range, the sub-airspace $A_1$. Of course, the boundaries of the aircraft' detectable ranges may change as the aircraft 12 travel through the airspace 10.

At step 52, the aircraft 12*e* may break the airspace 10 into a first plurality of smaller airspaces (i.e. a first level of sub-airspaces). The aircraft 12*e* may break the airspace 10 into a number of various different shapes of various different sizes based on a variety of factors, including the hardware limitations of the radar system (e.g., the resolution of the radar system, data storage limitations, etc.) and/or user preferences. In a preferred example, the aircraft 12*e* will break the airspace 10, and thus the sub-airspaces $A_{-1}$, $A_0$, and $A_1$, into a plurality of equal-sized cubes of volume $a^3$, which are the smallest sub-airspaces the aircraft 12*e* is capable of detecting. As such, the aircraft 12*e* may have a resolution factor r=A/a, which may indicate how finely the aircraft 12*e* has broken up its detectable range into smaller detectable sub-airspaces, and thus how detailed the aircraft's hazard data may be for the airspace 10.

Additionally, the aircraft 12*e* may also break the airspace 10 into multiple levels of sub-airspaces. More particularly, the aircraft 12*e* may break the airspace 10 into a second plurality of smaller airspaces (i.e. a second level of sub-airspaces), each of which contains two or more adjacent first level sub-airspaces. Similarly, the aircraft 12*e* may break the airspace 10 into a third plurality of smaller airspaces (i.e. a third level of sub-airspaces), each of which contains two or more adjacent second level sub-airspaces. This process may continue until the aircraft 12 breaks the airspace into a plurality of the largest detectable sub-airspaces (i.e. a highest level of sub-airspace), which are the sub-airspaces of volume $A^3$ (e.g., $A_{-1}$, $A_0$, and $A_1$). One way the aircraft 12*e* may accomplish this process is by selecting a total number of desired levels (T) of sub-airspaces in a largest detectable sub-airspace, and then determining the number of sub-airspaces (S) in each sub-airspace level (L) of the largest detectable airspace according to the following equation:

$$S_L=2^{x(T-L)}$$

where x is a designable integer. Based on this equation, the number of sub-airspaces at each level of the largest detectable sub-airspace will be a power of 2, and each sub-airspace in a given level will contain exactly $2^x$ sub-airspaces from the next first level.

Figure 4:
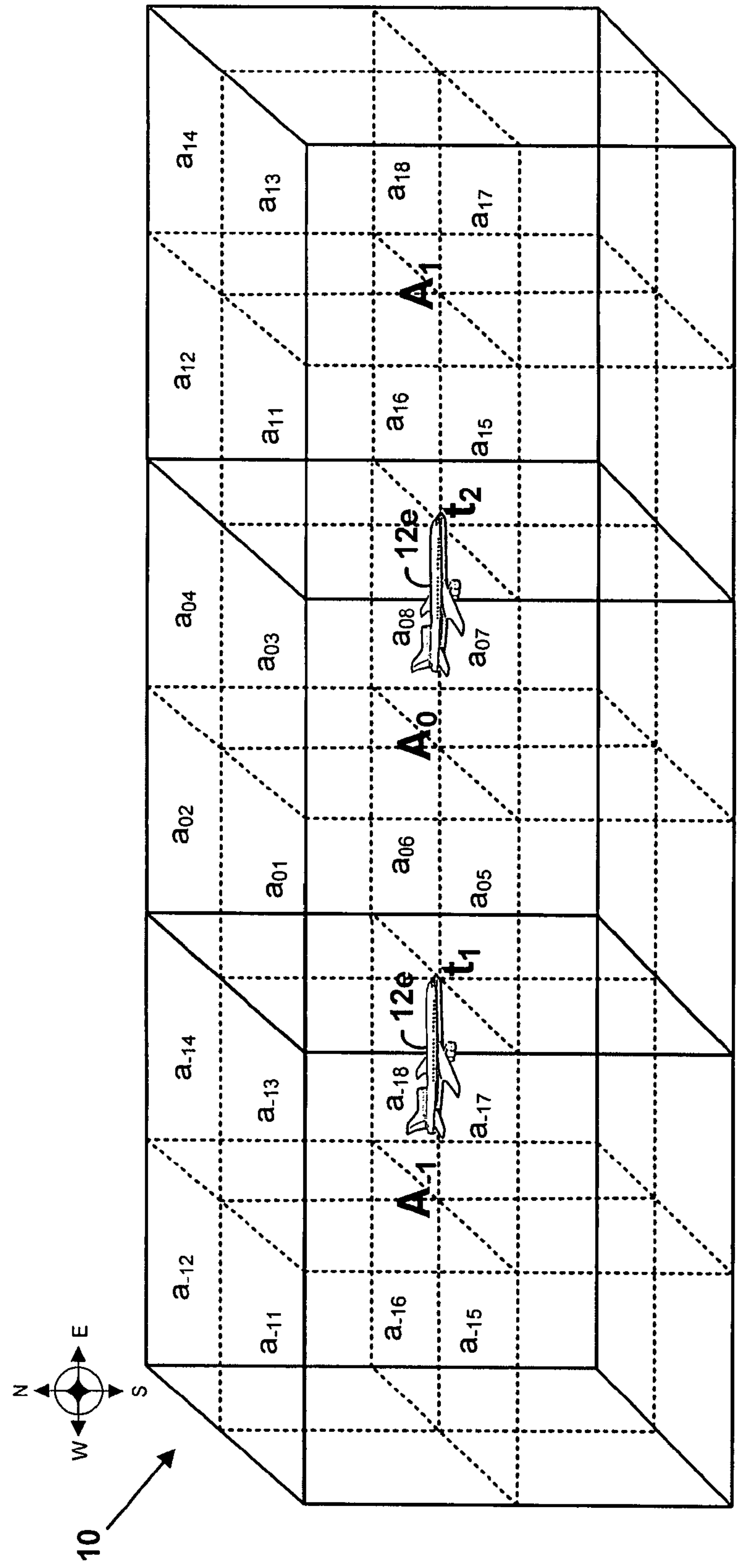
FIG. 4 is a diagram of the airspace of FIG. 1 broken into a first plurality of smaller airspaces, according to an example of the present invention.

FIG. 4 is a diagram of the airspace 10 broken into a first plurality of smaller airspaces, according to an example of the present invention. The aircraft 12*e* in FIG. 4, shown at time $t_1$ and time $t_2$, may break the airspace 10 into twenty-four first level sub-airspaces, each of which has the volume of $a^3$ (i.e., the smallest detectable volume of aircraft 12*e*). More particularly, the aircraft 12*e* may break each of the highest level sub-airspaces $A_{-1}$, $A_0$, and $A_1$ of the airspace 10 into eight first level sub-airspaces. As shown, the aircraft 12*e* may then assign one or more identifiers (e.g., a sub-airspace number) to the sub-airspaces for later reference, which may identify the sub-airspaces (e.g., by location and/or level). For example, the first number of the identifier may represent which highest level sub-airspace (e.g., $A_{-1}$, $A_0$, or $A_1$) the first level sub-airspace resides in relative to the aircraft 12*e*. Further, the second number of the identifier may represent the relative location of the first level sub-airspace within the highest level sub-airspace (e.g., 0 indicates south-west-above, 1 indicates north-west-above, etc.). The identifiers for the sub-airspaces may also change as the aircraft 12*e* travels through the airspace 10 to represent a new relative location of the first level sub-airspaces to the aircraft 12*e*. Further, the aircraft 12*e* may use a variety of different schemes to identify the sub-airspaces and their location. Preferably, however, each aircraft carrying out the present invention will implement the same sub-airspace identification scheme.

The aircraft 12*e* in FIG. 4 may additionally break the airspace 10 into multiple levels of sub-airspaces. As such, the aircraft 12*e* may break the airspace into a second level of sub-airspaces, each containing two or more adjacent level 1 sub-airspaces. As one example, the aircraft 12*e* may break the airspace 10 into a second level of sub-airspaces such that each level 2 sub-airspace contains two adjacent level 1 sub-airspaces (e.g., a first level 2 sub-airspace containing sub-airspaces $a_{01}$ and $a_{12}$, a second level 2 sub-airspace containing sub-airspaces $a_{03}$ and $a_{04}$, etc.). In this example, the aircraft 12*e* may also break the airspace 10 into a third level of sub-airspaces below the highest level of sub-airspaces (i.e., the largest detectable sub-airspaces $A_{-1}$, $A_0$, or $A_1$), such that each level 3 sub-airspace contains two adjacent level 2 sub-airspaces. As another example, the aircraft 12*e* may break the airspace 10 into a second level of sub-airspaces such that each level 2 sub-airspace contains four adjacent level 1 airspaces (e.g., a first level 2 sub-airspace containing $a_{01}$, $a_{02}$, $a_{03}$, and $a_{04}$, and a second level 2 sub-airspace containing $a_{05}$, $a_{06}$, $a_{07}$, and $a_{08}$, etc.), and level 2 would then be immediately below the highest level of sub-airspaces (i.e., the largest detectable sub-airspaces $A_{-1}$, $A_0$, or $A_1$).

Referring back to FIG. 3, at step 54, the aircraft 12*e* may then detect local hazard data for the sub-airspaces of the airspace 10. More particularly, the aircraft 12*e* may detect local hazard data for each of the sub-airspaces within its detectable range. Preferably, the aircraft 12*e* will detect the local hazard data via an on-board radar system, such as the radar system 38 described above with reference to FIG. 2. Further, the aircraft 12*e* will preferably detect local hazard data only for the first level of sub-airspaces within its detectable range, and the aircraft 12*e* may then determine hazard data for any higher level sub-airspaces as described in more detail below. As such, for each first level sub-airspace within the aircraft's detectable range, the aircraft 12*e* may determine the coordinates that define the boundaries of the sub-airspace (e.g., based on sub-airspace identifiers and navigation system data) and then survey the area within those coordinates for hazards according to known methods. The aircraft 12*e* may survey the sub-airspace for a predetermined time period, or the aircraft 12*e* may survey the sub-airspace until certain airspace conditions (e.g., hazards) are detected. Further, the aircraft 12*e* may survey the sub-airspace for (i) the presence of any hazard, (ii) the presence of specific types of hazards (e.g., weather, turbulence, REACT, target alert, etc.), or (iii) the presence and character (e.g., magnitude, etc.) of specific types of hazards. In any case, the aircraft 12*e* may then create local hazard data for the sub-airspace.

Once the aircraft 12*e* detects the local hazard data for a first sub-airspace within its detectable range, the aircraft 12*e* may then proceed to detecting local hazard data for a second sub-airspace with its detectable range. This process may continue until the aircraft 12*e* detects the local hazard data for each sub-airspace in the first level of its detectable range. Thereafter, the aircraft 12*e* may repeat the cycle by once again detecting the local hazard data for the first sub-airspace in its detectable region (the boundaries of which may have changed based on the aircraft's navigation data). Preferably, the aircraft 12*e* will determine the detecting order of the sub-airspaces within its detectable range based on sub-airspace identifiers. For example, referring to FIG. 4, the aircraft 12*e* may detect the local hazard data for sub-airspace $a_{01}$, and then sub-airspace $a_{02}$, and so on until the aircraft 12*e* detects the local hazard data for sub-airspace $a_{08}$. Thereafter, the aircraft 12*e* may repeat the cycle by once again detecting local hazard data for sub-airspace $a_{01}$.

At step 56, the aircraft 12*e* may receive remote hazard data from one or more other aircraft, such as aircraft 12*w* in FIG. 1. Preferably, the aircraft 12*e* will receive the remote hazard data from the aircraft 12*w* via a communication interface, such as the communication interface 40 described above with reference to FIG. 2. Further, the aircraft 12*e* will preferably have information about the remote hazard data formats (e.g., size and ordering of sub-airspaces, type of hazard information, etc.) and transmission methods of the aircraft 12*w* before receiving the remote hazard data. Preferably, the aircraft 12*e* will have that information because all aircraft in the airspace 10, including the aircraft 12*e* and the aircraft 12*w*, use the same hazard data formats and transmission methods. Alternatively, however, the aircraft 12*e* may obtain the information by exchanging control signals with the aircraft 12*w* before receiving the remote hazard data from the aircraft 12*w*.

The aircraft 12*e* may receive remote hazard data for any of a variety of different sub-airspaces of airspace 10. For example, the aircraft 12*e* may receive from aircraft 12*w* hazard data for sub-airspaces in sub-airspace $A_1$, which the aircraft 12*w* may have recently detected as local hazard data. As another example, the aircraft 12*e* may receive from aircraft 12*w* hazard data for sub-airspaces outside of sub-airspace $A_1$ (e.g., sub-airspaces to the east of sub-airspace $A_1$), which the aircraft 12*w* may have previously detected as local hazard data or received as remote hazard data from another aircraft. The hazard data for sub-airspaces outside of sub-airspace $A_1$ may even include hazard data for sub-airspaces within the detectable range of aircraft 12*e*, which is sub-airspace $A_0$. Depending on the sub-airspace location of the received remote hazard data, the aircraft 12*e* may then determine whether to update its stored hazard data with the remote hazard data, as described in more detail below.

At step 58, the aircraft 12*e* may update stored hazard data. For example, the aircraft 12*e* may update the stored hazard data based on (i) navigation data for the aircraft 12*e*, (ii) detected local hazard data for the sub-airspaces within the aircraft's detectable range, (iii) remote hazard data received from one or more other aircraft, such as aircraft 12*w*, and/or (iv) reliability of the stored hazard data. The aircraft 12*e* may update the stored hazard data based on this information at the same time, or at various different times based on the type of updating information.

The aircraft 12*e* may maintain, and thus need to update, stored hazard data for various sub-airspaces, including sub-airspaces at different levels inside its detectable range, sub-airspace $A_0$, and sub-airspaces at different levels outside of its detectable range (i.e., undetectable sub-airspaces). The undetectable sub-airspaces that the aircraft 12*e* maintains stored hazard data for may include sub-airspaces behind the aircraft 12*e*, which may have previously been detectable sub-airspaces of aircraft 12*e*, and sub-airspaces ahead of the aircraft $12e$ but outside of its detectable range, for which other aircraft may have broadcast remote hazard data. The aircraft 12*e* may maintain the stored hazard data for sub-airspaces within a predetermined "storage region" of the airspace 10. Preferably, the storage region will be limited to a fixed region surrounding the aircraft 12*e* that includes both a "past region" behind the nose of the aircraft 12*e* and a "future region" ahead of the nose of the aircraft 12*e*. In this respect, the aircraft 12*e* may select the size of the storage region based on its storage capacity, and the boundaries of the storage region may change as the aircraft 12*e* travels through airspace 10. However, in an alternate example, the storage region may be very large, in which case the aircraft 12*e* will maintain stored hazard data for any sub-airspace of airspace 10 regardless of the sub-airspace's relative location to the aircraft 12*e*.

The aircraft 12*e* may maintain and/or update different types of stored hazard data for the sub-airspaces at step 58. In this respect, the types of stored hazard data that the aircraft 12*e* maintains and/or updates may depend on the aircraft's resources (e.g., data storage capacity, processing capabilities, etc.). As one example, the aircraft 12*e* may maintain and/or update hazard indicators (e.g., the presence and magnitude of hazards) for the sub-airspaces. As another example, the aircraft 12*e* may maintain and/or update one or more sub-airspace identifiers (e.g., coordinates, relative location identifier, sub-airspace level identifier, past or future region identifier) for the sub-airspaces. As yet another example, the aircraft 12*e* may maintain and/or update one or more indicators relating to the reliability of the sub-airspaces' hazard data, such as indicators of (i) a source of the hazard data (e.g., detected locally or received remotely), (ii) a timestamp of the last hazard data update (e.g., from which the aircraft 12*e* may determine the amount of time since the last update), and/or (iii) a continuity of the hazard data (i.e., the length of time a hazard exits, ranging from a temporary hazard to a more lasting hazard). The aircraft 12*e* may maintain and/or update other types of stored hazard data as well.

The aircraft 12*e* may update the stored hazard data based on the navigation data (e.g., coordinates, direction, angle, etc.) of the aircraft 12*e*. More particularly, as the aircraft 12*e* flies through the airspace 10, the aircraft 12*e* may update the stored hazard data for the sub-airspaces within its storage range to reflect a new relative location of the sub-airspaces and their respective hazard data with respect to the aircraft 12*e*. As such, either periodically or in response to some triggering event, the aircraft 12*e* may determine the difference between its current navigation data and previously determined navigation data, and then update the stored hazard data for all maintained sub-airspaces based on that determination. The updating step may include (i) deleting the stored hazard data for sub-airspaces that are no longer within the storage range of the aircraft 12*e*, (ii) updating the stored hazard data for sub-airspaces that remain within the aircraft's storage range, and (iii) preparing the stored hazard data for sub-airspaces that are newly within the aircraft's storage range. After preparing the stored hazard data for the new sub-airspaces, the aircraft 12*e* may later update the new sub-airspaces' hazard indicators based on new hazard data detected as local hazard data or received as remote hazard data.

Referring back to FIG. 4, the following description will assume that the aircraft 12*e* has a storage range of volume $A^3$ in front of the aircraft 12*e* and volume $A^3$ behind the aircraft 12*e*. As such, the aircraft's storage region may include the sixteen first level sub-airspaces immediately surrounding the aircraft 12*e* (i.e., eight past region sub-airspaces and eight future region sub-airspaces).

As shown in FIG. 4, at time $t_0$, the aircraft 12*e* may be located between sub-airspaces $A_{-1}$ and $A_0$ at the intersection of first level sub-airspaces $a_{-13}$, $a_{-14}$, $a_{-17}$, $a_{-18}$, $a_{01}$, $a_{02}$, $a_{05}$, and $a_{06}$. As such, at time $t_0$, the aircraft 12*e* may maintain stored hazard data for all the first level sub-airspaces in highest level sub-airspaces $A_{-1}$ and $A_0$, because they are within the aircraft's storage range. The aircraft 12*e* may then travel east through the airspace 10 after time $t_o$, and at time $t_1$, the aircraft 12*e* may be located between sub-airspaces $A_0$ and $A_1$ at the intersection of first level sub-airspaces $a_{03}$, $a_{04}$, $a_{07}$, $a_{08}$, $a_{11}$, $a_{12}$, $a_{15}$, and $a_{16}$. The aircraft 12*e* may update its stored hazard data based on its navigation data at this time.

The aircraft 12*e* may first delete the stored hazard data for sub-airspaces $a_{-11}$, $a_{-12}$, $a_{-13}$, $a_{-14}$, $a_{-15}$, $a_{-16}$, $a_{-17}$, and $a_{-18}$, because those sub-airspaces are no longer within the aircraft's storage range. The aircraft 12*e* may update the stored hazard data for sub-airspaces $a_{01}$, $a_{02}$, $a_{03}$, $a_{04}$, $a_{05}$, $a_{06}$, $a_{07}$, and $a_{08}$, which remain in the aircraft's storage region. For example, if the stored hazard data includes one or more sub-airspace identifiers that identify a relative location of the sub-airspaces to the aircraft 12*e* (e.g., number, relative coordinates, past or future region indicator, etc.), the aircraft 12*e* may update the sub-airspace identifiers for these sub-airspaces. As such, in FIG. 4, the aircraft 12*e* may update the identifiers for these sub-airspaces by changing the first number of each identifier from a 0 to a −1, to represent that these sub-airspaces are now in the first sub-airspace of volume $A^3$ behind the aircraft 12*e*. As another example, if the stored hazard data is ordered such that it corresponds to the relative location of sub-airspaces, the aircraft 12*e* may shift the stored hazard data for these sub-airspaces to reflect their new relative location. The aircraft 12*e* may also prepare the stored hazard data for the sub-airspaces $a_{11}$, $a_{12}$, $a_{13}$, $a_{14}$, $a_{15}$, $a_{16}$, $a_{17}$, and $a_{18}$, which are now within the aircraft's storage range. For example, the aircraft 12*e* may assign identifiers to the new sub-airspaces that represent the absolute and/or relative location of the sub-airspaces, and the aircraft 12*e* may then store the identifiers in a given data storage location that is preferably empty. As another example, if the aircraft 12*e* orders the stored hazard data such that it corresponds to the relative location of sub-airspaces, the aircraft 12*e* may clear the hazard data for the data storage locations that correspond to the relative location of the new sub-airspaces.

Referring back to FIG. 3, the aircraft 12*e* may also update the stored hazard data based on the detected local hazard data for the sub-airspaces within the aircraft's detectable range. Preferably, the aircraft 12*e* will update the stored hazard data based on the detected local hazard data for a given sub-airspace in response to detecting the local hazard data for that given sub-airspace, thus minimizing the need for additional temporary storage. Alternatively, however, the aircraft 12*e* may update the stored hazard data based on the detected local hazard data for the given sub-airspace after detecting the local hazard data for all the sub-airspaces in the aircraft's detectable range. Alternatively yet, the aircraft 12*e* may update the stored hazard data based on the detected local hazard data for the given sub-airspace at some other time (e.g., a predetermined time specified by a user).

In any case, the aircraft 12*e* may update the stored hazard data based on the detected local hazard data according to a variety of different methods. As one example, for a given sub-airspace, the aircraft 12*e* may update the stored hazard data by entirely overwriting the hazard indicators with any newly detected local hazard data for the given sub-airspace. As another example, for a given sub-airspace, the aircraft 12*e* may only update the hazard indicators if the newly detected local hazard data indicates the presence of a hazard or specific type of hazard that the hazard indicators did not previously indicate. This example may result in the stored hazard data indicating the presence of hazards in the given sub-airspace even though the aircraft 12*e* detected the absence of the hazard locally, thus providing the aircraft 12*e* with a more cautious approach to hazard detection. However, to effectively implement this example, the aircraft 12*e* may also clear the indication of a hazard's presence in the stored hazard data in response to some triggering event (e.g., not detecting the hazard for a predetermined time period). In any of the above examples, the aircraft 12*e* may also update the reliability indicators (e.g., source, timestamp, and/or continuity) for the given sub-airspace's hazard data in the stored hazard data.

The aircraft 12*e* may further update the stored hazard data based on remote hazard data received from one or more other aircraft, such as aircraft 12*w*. Preferably, the aircraft 12*e* will update the stored hazard data based on the remote hazard data for a given sub-airspace in response to receiving the remote hazard data for the given sub-airspace from the aircraft 12*w*, thus minimizing the need for additional temporary storage. Alternatively, however, the aircraft 12*e* may update the stored hazard data based on the remote hazard data for the given sub-airspace after the aircraft 12*e* receives all the remote hazard data from the aircraft 12*w* (i.e., when the aircraft 12*w* stops sending hazard data to the aircraft 12*e*). Alternatively yet, the aircraft 12*e* may update the stored hazard data based on the remote hazard data for the given sub-airspace at some other time (e.g., a predetermined time specified by a user).

In any case, the aircraft 12*e* may update the stored hazard data based on the received remote hazard data according to a variety of different methods. As one example, for a given sub-airspace, the aircraft 12*e* may update the stored hazard data based on the remote hazard data by entirely overwriting the hazard indicators with any received remote hazard data for the given sub-airspace. As another example, for a given sub-airspace, the aircraft 12*e* may update the hazard indicators based on the remote hazard data for the given sub-airspace only if the aircraft 12*e* has not previously detected local hazard data for the given sub-airspace (i.e., the stored hazard data's source indicator does not indicate "detected locally"), thus giving priority to local hazard data over remote hazard data. As yet another example, for a given sub-airspace, the aircraft 12*e* may update the hazard indicators based on the remote hazard data for the given sub-airspace only if a timestamp in the received remote hazard data indicates that the remote hazard data is more recent than the stored hazard data, as indicated by a timestamp in the stored hazard data. As still another example, for a given sub-airspace, the aircraft 12*e* may only update the hazard indicators based on the remote hazard data if the received remote hazard data indicates the presence of a hazard or specific type of hazard that the stored hazard data did not previously indicate. This example may result in the stored hazard data indicating the presence of certain hazards in the given sub-airspace even though other aircraft, such as aircraft 12*w*, detected the absence of the hazard, thus providing the aircraft 12*e* with a more cautious approach to hazard detection. However, to effectively implement this example, the aircraft 12*e* may also clear the indication of a hazard's presence in the stored hazard data in response to some triggering event (e.g., not receiving remote hazard data that indicates the presence of a hazard for a predetermined time period). In any of the above examples, the aircraft 12*e* may also update the reliability indicators (e.g., source, timestamp, and/or continuity) for the given sub-airspace's hazard data in the stored hazard data.

As yet a further example, the aircraft 12*e* may update the stored hazard data based on the reliability of the stored hazard data (e.g., as embodied in the reliability indicators). As such, the aircraft 12*e* may (i) determine the reliability of the stored hazard data for a given sub-airspace (e.g., determine whether the source, timestamp, and/or continuity of the hazard data indicate that the stored hazard data is unreliable) and (ii) update the stored hazard data for a given sub-airspace based on that determination. In this respect, the aircraft 12*e* may determine that the stored hazard for a given sub-airspace is unreliable if the timestamp indicator for the given sub-airspace indicates that the aircraft 12*e* has not detected and/or received hazard data for the given airspace for a time period that exceeds some predetermined time period. The aircraft 12*e* may also determine that the stored hazard for a given sub-airspace is unreliable if the timestamp and/or continuity indicator for the given sub-airspace indicate that the hazard in the given sub-airspace was only temporary. Other examples for determining reliability are possible as well. In any case, the aircraft 12*e* may then update the unreliable stored hazard data for the given sub-airspace by (i) indicating the presence of all hazards, (ii) indicating the absence of all hazards, or (iii) deleting the stored hazard data for the given sub-airspace from data storage. Advantageously, this example may prevent the aircraft 12*e* from relying on unreliable (e.g., outdated, etc.) hazard data for the given sub-airspace, which may benefit the aircraft 12*e* and its user as well as other aircraft receiving remote hazard data from aircraft 12*e*.

As discussed above, the aircraft 12*e* may also maintain, and thus need to update, stored hazard data for higher level sub-airspaces (e.g., level 2 sub-airspaces) in addition to the first level sub-airspaces. In one example, the aircraft 12*e* may update the stored hazard data for the higher level sub-airspaces according to the methods described above. This example assumes, among other things, that the aircraft 12*e* detects local hazard data and receives remote hazard data for the higher level sub-airspaces. However, as described above, the aircraft 12*e* will preferably detect local hazard data only for the first level of sub-airspaces within its detectable range. Further, as described in more detail below with respect to hazard data transmission, the aircraft 12*e* may not receive remote hazard data for each sub-airspace level of the airspace 10 during a given period of time (or at all in some cases).

As such, the aircraft 12*e* may alternatively update the stored hazard data for the higher level sub-airspaces based on the stored hazard data for the first level sub-airspaces. As an example, for a given higher level sub-airspace (e.g., sub-airspace $A_0$), the aircraft 12*e* may (i) access the stored hazard data for each level 1 sub-airspace within the given higher level sub-airspace, (ii) determine the hazard data for the given higher level sub-airspace based on the stored hazard data for those level 1 sub-airspaces (e.g., if any of the level 1 sub-airspace within the given higher level sub-airspace indicates a hazard, then the given higher level airspace also contains that hazard), and then (iii) update the stored hazard data for the given higher level sub-airspace based on that determination. The aircraft 12*e* will thus preferably update the stored hazard data for higher level sub-airspaces after updating the stored hazard data for all lower level sub-airspaces.

By maintaining separate hazard data for both the first level sub-airspaces and higher level sub-airspaces, the aircraft 12*e* may be capable of accessing and/or transmitting hazard data for regions of the airspace 10 at various resolutions. In turn, this capability may improve the radar system of the present invention, as described in more detail below.

In addition to updating the stored hazard data, the aircraft 12*e* may also order the stored hazard data for the sub-airspaces to correspond to an identity of the sub-airspaces. For example, the aircraft 12*e* may order the stored hazard data for the sub-airspaces based on the location of the sub-airspaces. In this respect, the given aircraft may also separate the stored hazard data for sub-airspaces in the past region from the stored hazard data for sub-airspaces in the future region. As another example, the aircraft 12*e* may order the stored hazard data for the sub-airspaces based on the level of the sub-airspaces. In this respect, the aircraft 12 may also separate the stored hazard data for sub-airspaces in different levels of the airspace 10.

At step 60, the aircraft 12*e* may transmit the stored hazard data for receipt by one or more other aircraft, such as aircraft 12*w*. Preferably, the aircraft 12*e* will transmit the stored hazard data via a communication interface, such as the communication interface 40 described above with reference to FIG. 2. Further, the aircraft 12*e* will preferably broadcast the stored hazard data according to a variety of broadcast protocols. Further yet, the aircraft 12*e* will preferably transmit the stored hazard data cyclically in transmission sessions, such that once the aircraft 12*e* finishes transmitting the stored hazard data for sub-airspaces in a first transmission session according to a particular method, the aircraft 12*e* will begin transmitting the stored hazard data for the sub-airspaces in a second transmission session according to the same method. Within each transmission session, the aircraft 12*e* may also order the stored hazard data based on some criteria (e.g., sub-airspace identities).

The aircraft 12*e* may transmit the stored hazard data according to a variety of different methods. In this respect, the transmission method may depend on a variety of transmission characteristics (e.g., data rate, transmission range, etc.). As one example, during each transmission session, the aircraft 12*e* may transmit the stored hazard data for every sub-airspace for which the aircraft 12*e* maintains stored hazard data, regardless of whether the stored hazard data indicates a hazard for the sub-airspace. In this example, the aircraft 12*e* will preferably transmit (i) its navigation data and (ii) hazard indicators in a known order corresponding to the identity (e.g., location, level, etc.) of the sub-airspaces. If the aircraft 12*e* does not have stored hazard data for a given sub-airspace within the known order, the aircraft 12*e* may then transmit (i) an indicator of "missing" data for the given sub-airspace, (ii) an indicator of "all hazards" for the given sub-airspaces, or (iii) nothing for the given sub-airspace (i.e., temporarily interrupt transmission). Based on the aircraft's navigation data and the known order, aircraft receiving the stored hazard data may then determine the location of sub-airspaces corresponding to the hazard indicators, and thus the location of hazards. Advantageously, this example may eliminate the aircraft's need to maintain and/or transmit sub-airspace identifiers. However, in addition to maintaining and transmitting the hazard indicators in a known order, the aircraft 12*e* may still maintain and transmit certain sub-airspace identifiers (e.g., sub-airspace level indicators) along with the hazard indicators. Further, the aircraft 12*e* may also transmit some or all of the reliability indicators in the stored hazard data (e.g., the timestamp indicator).

As another example, during each transmission session, the aircraft 12*e* may transmit the stored hazard data for a given sub-airspace only if the stored hazard data indicates a hazard (or at least one specific type of hazard) for the given sub-airspace. In this example, the aircraft 12*e* will preferably transmit one or more sub-airspace identifiers (and possibly its navigation data and/or reliability indicators) along with the hazard indicators for the given sub-airspace, which may enable the receiving aircraft to identify the location of the sub-airspace corresponding to the hazard indicators, and thus the location of the hazard. Advantageously, this example may limit the amount of data the aircraft 12*e* transmits. However, this example may require the aircraft 12*e* to maintain sub-airspace identifiers in the stored hazard data, which may increase the amount of necessary data storage.

As yet another example, during each transmission session, the aircraft 12*e* may transmit the stored hazard data for a given sub-airspace only if the aircraft 12*e* updated the stored hazard data since the last transmission of the stored hazard data for the given sub-airspace. In this example, the aircraft 12*e* may determine whether a sub-airspace's hazard data has changed since its last transmission (e.g., based on the timestamp indicator and an indicator of the last transmission time), and the aircraft 12*e* may then transmit the hazard indicators for the given sub-airspace based on this determination. Further, in this example, the aircraft 12*e* will preferably transmit one or more sub-airspace identifiers (and possibly its navigation data and/or reliability indicators) along with the hazard indicators for the given sub-airspace, which may enable the receiving aircraft to identify the location of the sub-airspace corresponding to the hazard indicators, and thus the location of the hazard. Advantageously, this example may further limit the amount of data the aircraft 12*e* transmits. However, this example may require the aircraft 12*e* to perform additional functions and maintain additional data (e.g., indicators of transmission times) in data storage to track the updating of the stored hazard data, which may not be desirable.

As still another example, during each transmission session, the aircraft 12*e* may transmit the stored hazard data for sub-airspaces in a specific region, know as a "transmit region." Preferably, the transmit region will immediately surrounding the aircraft, including both past region sub-airspaces and future region sub-airspaces of the storage region. Further, the transmit region will preferably be smaller than the aircraft's storage region, but the transmit region may alternatively be identical to the storage region. In either case, the boundaries of the transmit region may change based on the aircraft's navigation data. As such, during each transmission session, the aircraft 12*e* may (i) determine its current transmit region (e.g., based on transmit region criteria and navigation data), and then (ii) transmit the stored hazard data for each sub-airspace within the transmit region. In this respect, the aircraft 12*e* may transmit the stored hazard data for all sub-airspaces within the transmit region (e.g., according to a know order), or the aircraft 12*e* may transmit the stored hazard data for select sub-airspaces within the transmit region (e.g., sub-airspaces with stored hazard data indicating either a hazard or a recent update), in which case the aircraft 12*e* may also transmit sub-airspace identifiers with the stored hazard data. In either case, the aircraft 12 may also order the stored hazard data for transmission such that it transmits the stored hazard data for the past region sub-airspaces together and transmits the stored hazard data for the future region sub-airspace together.

In any of the above examples, the aircraft 12*e* may transmit the stored hazard data for the first level sub-airspaces only, or the aircraft 12*e* may transmit the stored hazard data for the first level sub-airspaces and higher level sub-airspaces. If the aircraft 12*e* transmits the stored hazard data for multiple levels of sub-airspaces, the aircraft 12*e* will preferably transmit the stored hazard data for an entire sub-airspace level before transmitting the stored hazard data for another sub-airspace level, in which case the aircraft 12*e* may also transmit sub-airspace level indicators along with the stored hazard data (e.g., at the beginning of each new level or with each transmitted sub-airspace). Further, during each transmission session, the aircraft 12*e* will preferably transmit the stored hazard data for the highest level sub-airspace first, and then transmit the stored hazard data for the next lower level sub-airspaces, and so on until the aircraft 12*e* transmits the stored hazard data for the first level sub-airspaces. Thereafter, the aircraft 12*e* may begin a new transmission session with the highest level sub-airspace.

In this respect, during each transmission session, the receiving aircraft (e.g., aircraft 12*w*) may first receive low resolution hazard data for a region of the airspace 10, and may then receive hazard data for that with higher and higher resolutions, thus providing the aircraft 12*w* with an increasingly detailed view of the region of the airspace 10. As such, if aircraft 12*e* is transmitting the hazard data for a given region of airspace 10, such as sub-airspace $A_0$, and the aircraft 12*w* encounters the sub-airspace $A_0$ before receiving all the hazard data from aircraft 12*e*, the aircraft 12*w* may at least have some hazard data for the sub-airspace $A_0$, albeit at a lower resolution.

If the aircraft 12*e* transmits the stored hazard data for the higher level sub-airspaces as well as the first level sub-airspaces, the aircraft 12*e* may also first determine whether to transmit the stored hazard data for each sub-airspace level during a transmission session. The aircraft 12*e* may make that determination based on a predetermined or random probability, a predetermined schedule, and/or some other system parameters. For example, the aircraft 12*e* may transmit level 1 sub-airspaces during each transmission session, but the aircraft 12*e* may only transmit level 2 sub-airspaces during 50% of transmission sessions. Alternatively, during each transmission session, the aircraft 12*e* may transmit each sub-airspace level randomly according to a probability q, which the aircraft 12*e* may choose independently from a distribution.

In addition to the above functions, the aircraft 12*e* may also provide the stored hazard data to a user of the aircraft 12*e*, such as a pilot. For example, the aircraft 12*e* may provide the stored hazard data to the user as a visual graphical display of the airspace 10. That graphical display may use colors, icons, and text to notify the user of the hazard data for the airspace 10. Additionally, the aircraft 12*e* may provide the stored hazard data to the user as audio notifications of hazard data. Preferably, the aircraft 12*e* will display hazard data to the user at all times during the flight of the aircraft 12*e*. Further, the aircraft 12*e* will preferably update the display in response to updating the stored hazard data at step 58. Further yet, the aircraft will preferably only provide the user with the stored hazard data for sub-airspaces in the future region only. Advantageously, displaying the hazard data may enable the user of the aircraft to avoid airspace hazards.

Figure 5:
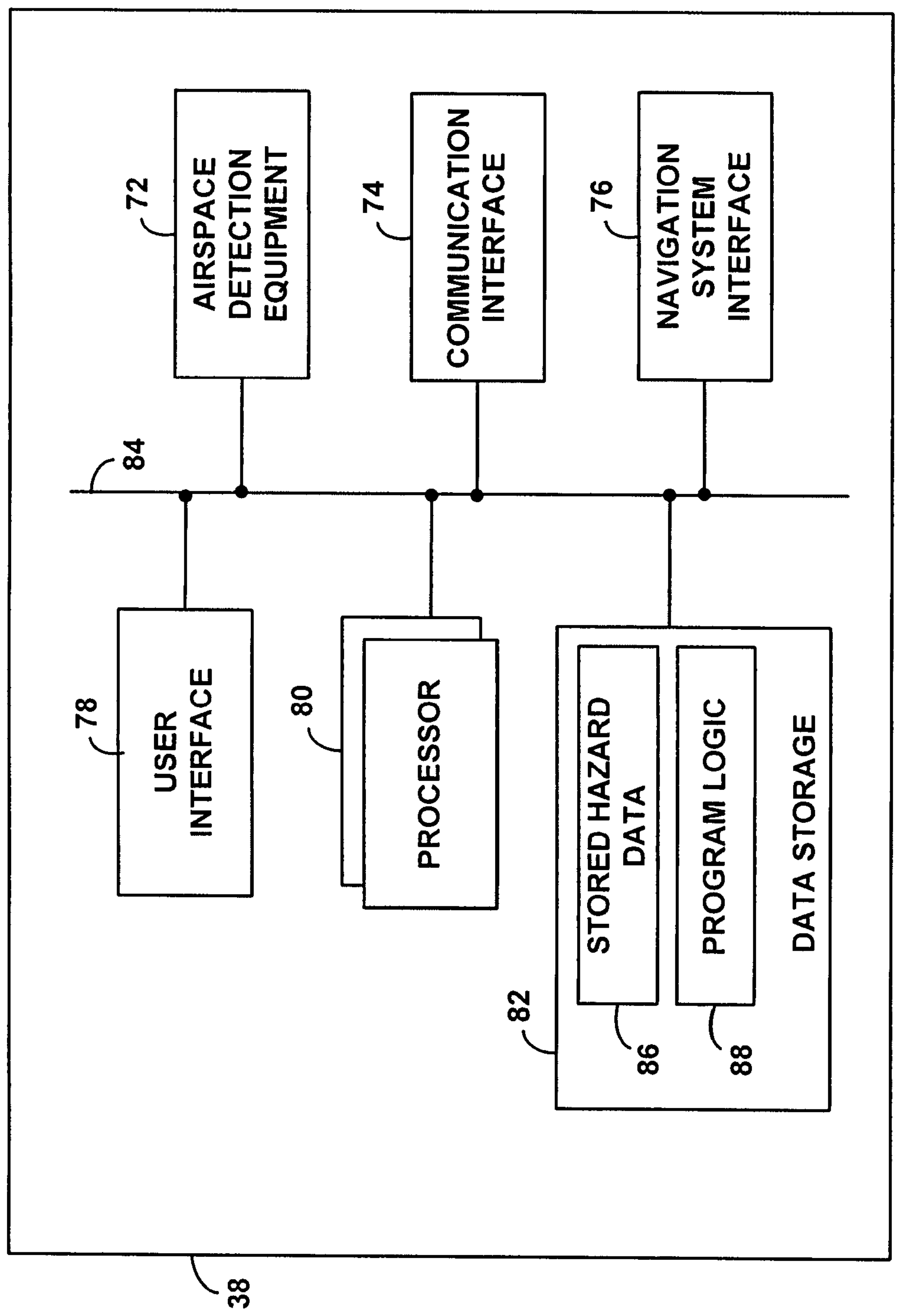
FIG. 5 is a simplified block diagram of the radar system of FIG. 2, showing functional components that can operate to carry out aspects of the present invention.

In a preferred example, all of the aircraft 12 in the airspace 10 may carry out the functions described in a similar manner, to facilitate a seamless transmission and maintenance of hazard data for the aircraft 12. The functionality of the present invention may be implemented in one or more components of the aircraft 12. In a preferred example, the aircraft's radar system 38 may carry out functions of the present invention. Accordingly, FIG. 5 is a simplified block diagram of the radar system 38 of FIG. 2, showing functional components that can operate to carry out aspects of the present invention. As shown in FIG. 5, the exemplary radar system 38 includes, without limitation, airspace detection equipment 72, a communication interface 74, a navigation system interface 76, a user interface 78, a processor 80, and data storage 82, all interconnected by a system bus or other connection mechanism 84. The exemplary radar system 38 may also include other components, such as a SATCOM receiver (not shown).

The airspace detection equipment 72 may function to detect spatio-temporal conditions in the aircraft's detectable range, such as air data (e.g., wind, air pressure, and temperature conditions) and hazard information (e.g., presence, location and magnitude of weather hazards, predictive windshear, turbulence, etc.). As such, the airspace detection equipment 72 may include, without limitation, a radar antenna, an infrared sensor, a temperature sensor, a radar tilt sensor, and/or other equipment that facilitates the detection airspace conditions.

The communication interface 74 may function to communicatively couple the radar system 38 to other radar systems, such as on-board aircraft radar systems, ground-based radar systems, and/or satellite radar systems. As such, the communication interface 74 preferably takes the form of a chipset and antenna adapted to facilitate wireless communication of radar information according to one or more desired protocols (e.g., a protocol in the spirit of User Datagram Protocol (UDP) over Internet Protocol (IP)). The radar system 38 may also include multiple communication interfaces 74, such as one through which the radar system 38 sends radar information and one through which the radar system 38 receives radar information. In a preferred example, the radar system's communication interface 74 may be integrated together in whole or in part with the aircraft's communication interface 40, as described with reference to FIG. 2 above.

The navigation system interface 76 may function to communicatively couple the radar system 38 to the aircraft's navigation system 36. As such, the navigation system interface 74 preferably takes the form of a wired interface, such as an Ethernet network interface card, through which the radar system 38 communicates navigation data and radar data with the navigation system 36. The radar system 38 may also include multiple navigation system interfaces 76, such as one through which the radar system 38 sends communication (e.g., radar data, navigation data requests) and one through which the radar system 38 receives communication (e.g., navigation data, radar data requests).

The user interface 78 preferably functions to facilitate user interaction with the radar system 38. For example, the user interface 78 may include input components, such as a microphone for receiving voice commands from a user and multi-functional buttons and/or a keyboard for facilitating tactile user input. Additionally, the user interface 78 may include output components, such as a speaker for playing out audio (e.g., weather warnings) from the radar system 38 and/or a display screen for displaying airspace conditions to the user. In a preferred example, the display screen may also display data from the aircraft's other components (e.g., the navigation system 36).

The processor 80 may comprise one or more general purpose microprocessors and/or dedicated signal processors. (The term "processor" encompasses either a single processor or multiple processors that could work in combination.) Data storage 82, in turn, may comprise memory and/or other storage components, such as optical, magnetic, organic or other memory or disc storage, which can be integrated in whole or in part with the processor 80. Data storage 82 preferably contains or is arranged to contain (i) stored hazard data 86 and (ii) program logic 88. Although these components are described herein as separate data storage elements, the elements could just as well be physically integrated together or distributed in various other ways. In a preferred example, the stored hazard data 86 would be maintained in data storage 82 separate from the program logic 88, for easy updating and reference by the program logic 88.

Stored hazard data 86 may contain hazard indicators for each sub-airspace within the aircraft's storage region, and the hazard indicators may take various forms. As one example, the hazard indicators in the stored hazard data 86 may simply indicate whether any hazard exists in a given sub-airspace (e.g., a single bit displaying a "1" for hazard and a "0" for no hazard). Alternatively, the hazard indicators in the stored hazard data 86 may indicate the presence of specific types of hazards (e.g., weather, turbulence, REACT, target alert, etc.) in a sub-airspace (e.g., a bit for each hazard type displaying a "1" for hazard and a "0" for no hazard). Alternatively yet, the hazard indicators in stored hazard data 86 may indicate both the presence and magnitude of the specific types of hazards.

Stored hazard data 86 may also contain one or more sub-airspace identifiers for each sub-airspace, which identify the sub-airspace to which the hazard indicators correspond. For example, the sub-airspace identifiers may represent the absolute location of the sub-airspace (e.g., coordinates), the relative location of the sub-airspace with respect to the aircraft 12 (e.g., a number, letter, direction, relative coordinate, past or future region flag, etc.), and/or the level of the sub-airspace (e.g., level 1, level 2, etc.).

Stored hazard data 86 may further contain reliability indicators for each sub-airspace within the aircraft's storage region. For example, stored hazard data 86 may contain indicators of (i) a source of the hazard data (e.g., detected locally or received remotely), (ii) a timestamp of the last hazard data update, and/or (iii) a continuity of the hazard data (i.e., the length of time a hazard exits, ranging from a temporary hazard to a more lasting hazard), Stored hazard data 86 may additionally contain other data relating the sub-airspaces of airspace 10 and/or the detection, maintenance, and/or transmission of hazard data therein (e.g., indicators of transmission times, etc.).

The aircraft 12 may maintain the stored hazard data 86 for the sub-airspaces in data storage 82 in a manner that corresponds to the identity of the sub-airspaces (e.g., level or location of the sub-airspace). For example, the aircraft 12 may maintain the stored hazard data 86 for the sub-airspaces in an order that corresponds to the relative location of the sub-airspace to the aircraft 12 (e.g., $1^{st}$ storage location contains the stored hazard data for the sub-airspace in the upper-north-west corner of the detectable range, $2^{nd}$ storage location contain stored hazard data for the sub-airspace east of the $1^{st}$ sub-airspace, etc.). As another example, the aircraft 12 may maintain the stored hazard data 86 for the sub-airspaces in an order that corresponds to the level of the sub-airspaces (e.g., highest level sub-airspace hazard data stored together in the top storage locations, followed by the level sub-airspace hazard data, etc.). Alternatively, the aircraft 12 may maintain the stored hazard data 86 for each sub-airspace level separately in data storage 82 (e.g., a separate queue for each sub-airspace level). As yet another example, the aircraft 12 may maintain the stored hazard data 86 for sub-airspaces in the past region separately from the sub-airspaces in the future region (e.g., separate queues for the past region sub-airspaces and the future region sub-airspaces). Other examples are possible as well.

Figure 6:
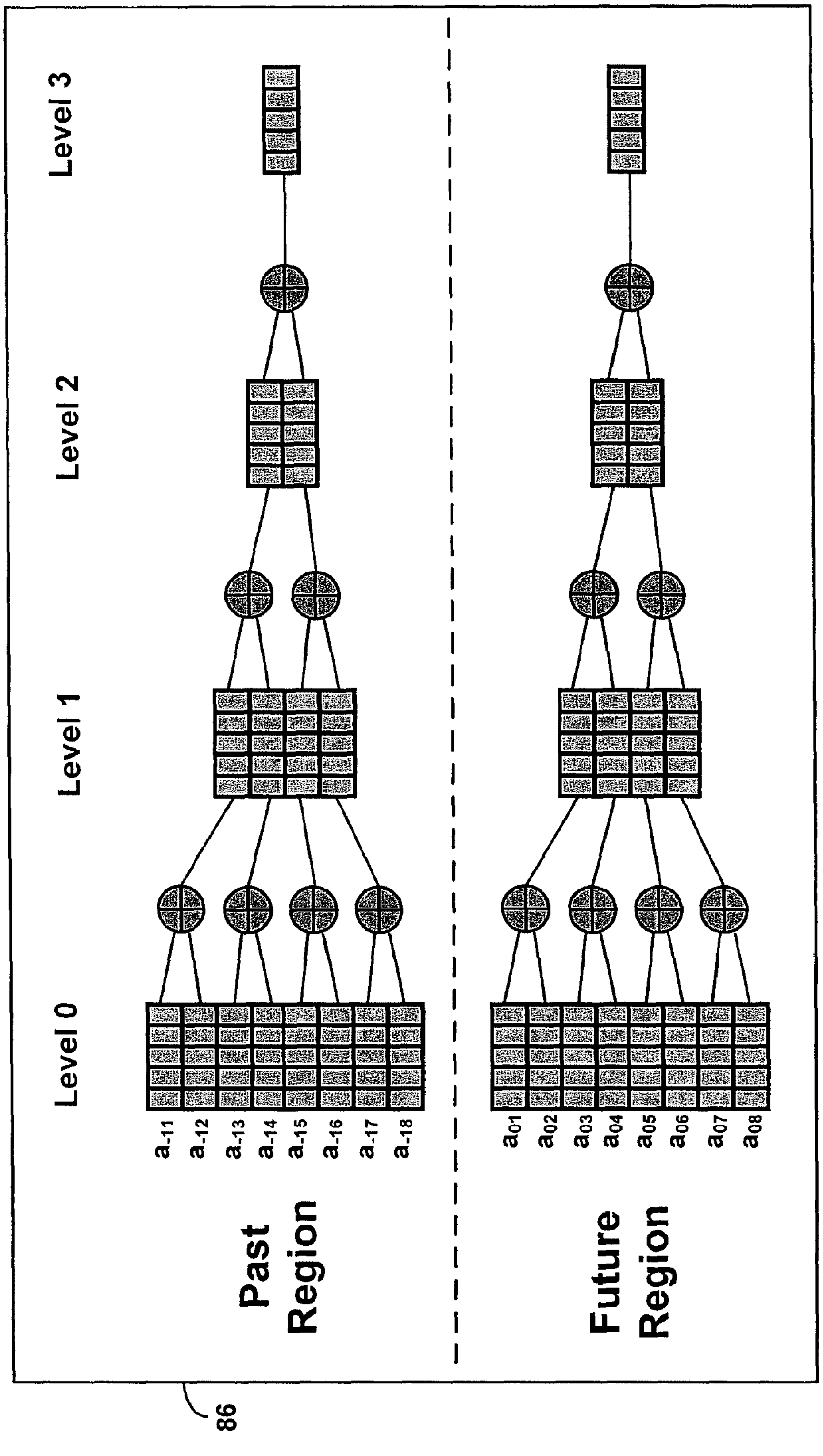
FIG. 6 depicts a data storage scheme for stored hazard data for a plurality of smaller airspaces of the airspace of FIG. 1, according to an example of the present invention.

FIG. 6 depicts a data storage scheme for the stored hazard data 86 for the sub-airspaces of the airspace 10, according to an example of the present invention. As described above with reference to FIG. 4, the aircraft 12*e* may break the airspace 10 into twenty-four first level sub-airspaces, and the aircraft's storage region may include both the eight first level sub-airspaces immediately behind the aircraft 12*e* and the eight first level sub-airspaces immediately ahead of the aircraft 12*e*. For purposes of illustration, the following specification will also assume that the aircraft 12*e* is at time $t_1$, and that the aircraft 12*e* has further broken the airspace 10 into twelve level 2 sub-airspaces, six level 3 sub-airspaces, and three level 4 sub-airspaces (i.e., sub-airspaces $A_{-1}$, $A_0$, and $A_1$), each of which contain two adjacent sub-airspaces from the next lowest sub-airspace level.

As shown, data storage 82 may be separated into past region queues and future region queues. At time $t_1$, the past region queues may contain the stored hazard data 86 for the sub-airspaces within the sub-airspace $A_A$, and the future region queues may contain the stored hazard data 86 for the sub-airspaces within the sub-airspace $A_0$. The past region and future region queues may further be separated into queues for each sub-airspace level (e.g., level 1, level 2, level 3, and level 4) of the past and future region. Each sub-airspace level queue in the past or future region queues may contain a number of rows equivalent to the number of sub-airspaces in the level of that region, and each sub-airspace level queue row may thus contain the stored hazard data for a single sub-airspace of airspace 10. As shown, the aircraft 12*e* may also order the stored hazard data 86 in the sub-airspace level queue rows according to the relative locations of the sub-airspaces with respect to the aircraft 12. Each sub-airspace level queue row will preferably contain an amount of storage (e.g., number of bits) necessary to hold the stored hazard data 86 for a single sub-airspace (e.g., hazard indicators, any sub-airspace identifiers, and/or other indicators).

In addition to the queues, data storage 82 may also contain a plurality of bitwise ORs between the sub-airspace level queues for each region. The bitwise ORs may function to OR the hazard indicators for two consecutive rows from a lower level queue (e.g., level 1) and then output the result to a single row of the next higher level queue (e.g., level 2). As such, the data storage scheme depicted in FIG. 6 allows the aircraft 12 to update the stored hazard data 86 for higher level sub-airspaces of the past and future regions automatically based on the first level sub-airspaces, without detecting local hazard data or receiving remote hazard data for the higher level sub-airspaces.

Referring back to FIG. 5, the program logic 88 preferably comprises machine language instructions that are executed or interpreted by processor 80 to carry out functions according to examples of the present invention. It should be understood, however, that the program logic 88 and its associated functions are described herein by way of example only. As such, those skilled in the art will appreciate that other program logic and/or functions may be used instead, some program logic and/or functions may be added, and some program logic and/or functions may be omitted altogether. Further, the various functions described herein can be embodied in software, hardware, and/or firmware. In a preferred example, the program logic 88 will be embodied in an application layer protocol of the Open Systems Interconnection (OSI) network protocol model.

For example, the program logic 88 may be executable by the processor 80 to break the airspace 10 into a first plurality of smaller airspaces (i.e., a first level of sub-airspaces). In a preferred example, the radar system 38 will break the airspace 10, and thus the sub-airspaces $A_{-1}$, $A_0$, and $A_1$, into a plurality of equal-sized cubes of volume $a^3$, which are the smallest sub-airspaces the radar system 38 is capable of detecting. After the radar system 38 determines the shape and size of the sub-airspaces, the radar system 38 may then break the airspace 10 into the plurality of sub-airspaces based on prior knowledge of the airspace 10 (e.g., based on user input). Alternatively, the radar system 38 may break the airspace 10 into the plurality of sub-airspaces dynamically (i.e., in-flight) by periodically breaking its detectable range into a plurality of sub-airspaces. In either case, the radar system may also assign sub-airspace identifiers to each sub-airspace and then store the identifiers as stored hazard data 86 in data storage.

After the radar system 38 breaks the airspace 10 into the first level of sub-airspaces, the program logic 88 may also be executable by the processor 80 to break the airspace 10 into multiple levels of sub-airspaces. More particularly, the aircraft 12*e* may break the airspace 10 into a second plurality of smaller airspaces (i.e. a second level of sub-airspaces), each of which contains two or more adjacent first level sub-airspaces. Similarly, the aircraft 12*e* may break the airspace 10 into a third plurality of smaller airspaces (i.e. a third level of sub-airspaces), each of which contains two or more adjacent second level sub-airspaces. This process may continue until the aircraft 12 breaks the airspace into a plurality of the largest detectable sub-airspaces (i.e. a highest level of sub-airspace), which are the sub-airspaces of volume $A^3$ (e.g., $A_{-1}$, $A_0$, and $A_1$).

The program logic 88 may further be executable by the processor 80 to detect local hazard data for the sub-airspaces of the airspace 10 via the airspace detection equipment 72. More particularly, the program logic 88 may cause the radar system 38 to detect local hazard data for each of the sub-airspaces within the radar system's detectable range. Preferably, the radar system 38 will detect the local hazard data only for the first level sub-airspaces of its detectable range. As such, for a given first level sub-airspace, the program logic 88 may cause the radar system 38 to (i) determine the boundaries of the given sub-airspace (e.g., based on stored hazard data 86 and navigation data received via the navigation system interface 76), (ii) survey the area within those coordinates for hazards (e.g., presence and/or magnitude of one or more hazard types) via the airspace detection equipment 72, and (iii) create local hazard data for the given sub-airspace.

The program logic 88 may additionally be executable by the processor 80 to receive remote hazard data from one or more other aircraft via the communication interface 74. In turn, the communication interface 76 may send the received remote hazard data to the processor 80 and/or data storage 82 for later updating of the stored hazard data 86.

The program logic 88 may be executable by the processor 80 to update the stored hazard data 86 in data storage 82. As one example, the program logic 88 may cause the radar system 38 to update the stored hazard data based on navigation data received via the navigation system interface 76. As such, either periodically or in response to some triggering event, the program logic may cause the radar system 38 to (i) request current navigation data from the navigation system via the navigation system interface, (ii) receive the request navigation data the navigation system interface 76, (iii) compare the current navigation data to previously determined navigation data (e.g., which may be stored in data storage 82), and then (iv) update the stored hazard data 86 based on that comparison (e.g., by clearing, modifying, and/or shifting stored hazard data 86 in data storage 82).

As another example, the program logic 88 may cause the radar system 38 to update the stored hazard data based on local hazard data detected via the airspace detection equipment 72. As such, the program logic 88 may cause the radar system 38 to (i) identify which sub-airspace the local hazard data corresponds to (e.g., based on identifier in the local hazard data), (ii) locate the stored hazard data 86 for the sub-airspace in data storage 82, and (iii) update the stored hazard data 86 based on the local hazard data. In one respect, the radar system 38 may update the stored hazard data 86 by entirely overwriting the hazard indicators the with local hazard data. In another respect, the radar system 38 may only update the hazard indicators in the stored hazard data 86 if the newly detected local hazard data indicates the presence of a hazard or specific type of hazard that the stored hazard data 86 did not previously indicate. In this respect, the program logic 88 may also cause the radar system 38 to clear the indication of a hazard's presence in the stored hazard data 86 in response to some triggering event (e.g., not detecting the hazard for a predetermined time period). When updating the stored hazard data as described above, the program logic 88 may also cause the radar system 38 to update the reliability indicators (e.g., source, timestamp, and/or continuity) in the stored hazard data 86.

As yet another example, the program logic 88 may cause the radar system 38 to update the stored hazard data based on remote hazard data received via the communication interface 74. As such, the program logic 88 may cause the radar system 38 to (i) identify which sub-airspace the remote hazard data corresponds to (e.g., based on identifiers in the remote hazard data), (ii) locate the stored hazard data 86 for the sub-airspace in data storage 82, and (iii) update the stored hazard data 86 based on the remote hazard data. In one respect, the radar system 38 may update the stored hazard data 86 by entirely overwriting the hazard indicators the with remote hazard data. In another respect, the radar system 38 may only update the hazard indicators in stored hazard data 86 if the radar system 38 has not previously detected local hazard data for the sub-airspace (i.e., the stored hazard data's source indicator does not indicate "detected locally"). In yet another respect, the radar system 38 may only update the hazard indicators in stored hazard data 86 if a timestamp in the received remote hazard data indicates that the remote hazard data is more recent than the stored hazard data 86, as indicated by a timestamp in the stored hazard data 86. In still another respect, the radar system 38 may only update the hazard indicators in stored hazard data 86 if the received remote hazard data indicates the presence of a hazard or specific type of hazard that the stored hazard data 86 did not previously indicate. In this respect, the program logic 88 may also cause the radar system 38 to clear the indication of a hazard's presence in the stored hazard data 86 in response to some triggering event (e.g., not receiving an indication of the hazard's presence for a predetermined time period). When updating the stored hazard data as described above, the program logic 88 may also cause the radar system 38 to update the reliability indicators (e.g., source, timestamp, and/or continuity) in the stored hazard data 86.

As still a further example, the program logic 88 may cause the radar system 38 to update the stored hazard data 86 based on the reliability of the stored hazard data 86 (e.g., as embodied in the reliability indicators in stored hazard data 86). As such, the program logic 88 may cause the radar system 38 to (i) determine whether the stored hazard data 86 is unreliable, and (ii) update the stored hazard data 86 (e.g., clearing the data or indicating all hazards) based on that determination. In this respect, the radar system 38 may determine that the stored hazard data 86 is unreliable if the timestamp indicator indicates that the radar system 38 has not detected and/or received hazard data for a time period that exceeds some predetermined time period (e.g., which may be stored as stored hazard data 86). The radar system 38 may also determine that the stored hazard data 86 is unreliable if the timestamp and/or continuity indicators indicate that a hazard indicated in the stored hazard data 86 was only temporary. Other examples for determining reliability are possible as well If the radar system 38 breaks the airspace 10 into multiple levels of sub-airspaces, the program logic 88 may also be executable by the processor 80 to update the stored hazard data 86 for higher level sub-airspaces based on the stored hazard data 86 for the first level sub-airspaces. As such, the program logic 88 may cause the radar system 38 to (i) access the stored hazard data 86 for each first level sub-airspace within a given higher level sub-airspace, (ii) determine the hazard data for the given higher level sub-airspace based on the stored hazard data 86 for the first level sub-airspaces (e.g., if any of the level 1 sub-airspace within the given higher level sub-airspace indicates a hazard, then the given higher level airspace also has a hazard), and then (iii) update the stored hazard data 86 for the given higher level sub-airspace based on that determination. However, as described above with reference to FIG. 6, the data storage scheme for the stored hazard data 86 may allow the radar system 38 to update the stored hazard data 86 for higher level sub-airspaces of automatically based on the first level sub-airspaces, without the need for additional processing.

The program logic 88 may still further be executable by the processor 80 to transmit the stored hazard data 86 via the communication interface 74 for receipt by one or more other aircraft. As such, the program logic 88 may first cause the radar system 38 to determine whether to transmit stored hazard data 86 for each of the sub-airspaces.

As one example, the radar system 38 may transmit the stored hazard data 86 for every sub-airspace. As another example, the radar system 38 may transmit the stored hazard data 86 for sub-airspaces with stored hazard data 86 that indicates the presence a hazard (or at least one specific type of hazard), in which case the program logic 88 may cause the radar system 38 to consult the hazard indicators in the stored hazard data 86 for the sub-airspaces. As yet another example, the radar system 38 may transmit the stored hazard data 86 for sub-airspaces with stored hazard data 86 that the radar system 38 has updated since the last transmission, in which case the program logic 88 may cause the radar system 38 to consult update information in the stored hazard data 86 for the sub-airspaces. As still another example, the radar system 38 may only transmit the stored hazard data 86 for sub-airspaces within the transmit region, in which case the program logic 88 may cause the radar system 38 to determine which sub-airspaces fall within the transmit region (e.g., based on transmit region criteria stored in data storage 82 and navigation data obtained via the navigation system interface 74). As yet a further example, the radar system 38 may only transmit the stored hazard data 86 for sub-airspaces within certain sub-airspace levels of the airspace 10, in which case the program logic 88 may cause the radar system 38 to determine the level of the sub-airspaces (e.g., based on sub-airspace identifiers in stored hazard data 86) and whether the determined level should be transmitted (e.g., based on a probability or schedule stored in data storage 82).

The program logic 88 may also cause the radar system 38 to determine the type of stored hazard data 86 to transmit. In a preferred example, the radar system 38 will always transmit the hazard indicators in stored hazard data 86 for the sub-airspaces. Additionally, the radar system 38 may transmit one or more sub-airspace identifiers (e.g., location or level identifiers) in stored hazard data 86 for the sub-airspaces. Additionally yet, the radar system 38 may transmit reliability indicators in stored hazard data 86 for the sub-airspaces.

After the determinations above, the program logic 88 may cause the radar system to access the desired stored hazard data 86 from data storage 82, place the stored hazard data 86 in a desired order (e.g., based on the relative location and/or level of the sub-airspaces), and then transmit the stored hazard data 86 via the communication interface 74. Additionally, depending on the character of the stored hazard data 86 transmitted, program logic 88 may also cause the radar system 38 to transmit navigation data with the stored hazard data 86 (e.g., if the sub-airspace identifier represents a relative location), in which case the radar system 38 may first obtain the navigation data from the navigation system via the navigation system interface 76.

Additionally, the program logic 88 may be executable by the processor 80 to provide the stored hazard data 86 via the user interface 78 to a user of the radar system 38, such as a pilot of aircraft 12. As such, the program logic 88 may cause the radar system 38 to provide the user with a visual graphic display of the airspace 10 and its hazard data, as well as audio notifications of hazard data, via the user interface 78. In a preferred example, the radar system 38 will only provide the user with the stored hazard data for sub-airspaces in the future region.

Exemplary embodiments of the present invention have been described above. Those skilled in the art will understand, however, that changes and modifications may be made to the embodiments described without departing from the true scope and spirit of the present invention, which is defined by the claims.

We claim:

1. A method for maintaining and transmitting updated weather hazard data for a given area containing a given node, wherein the method is implemented using a processor of the given node, wherein the given node communicates with one or more other nodes, and wherein the given node is capable of detecting local weather hazard data over a detectable range of the given area, the method comprising:

breaking the given area into a plurality of smaller areas;

detecting local weather hazard data for each of the plurality of smaller areas located within the detectable range of the given area using a radar system of the given node;

receiving remote weather hazard data from the one or more other nodes using a communication interface of the given node;

updating stored weather hazard data based on the detected local weather hazard data and the remote weather hazard data received from the one or more other nodes; and transmitting the updated stored weather hazard data for receipt by the one or more other nodes using the communication interface of the given node.

2. The method of claim 1, wherein the given area comprises an airspace, wherein the given node and the one or more other nodes comprise aircrafts, and wherein the weather hazard data comprises airspace weather hazard data.

3. The method of claim 1, wherein breaking the given area into a plurality of smaller areas and updating stored weather hazard data are carried out by an application layer protocol of the Open Systems Interconnection (OSI) network protocol model.

4. The method of claim 1, further comprising:

assigning identifiers to each of the plurality of smaller areas; and storing the identifiers as weather hazard data.

5. The method of claim 1, wherein the plurality of smaller areas comprises a first plurality of smaller areas, further comprising:

breaking the given area into a second plurality of smaller areas, wherein each of the second plurality of smaller areas contains two or more of the first plurality of smaller areas.

6. The method of claim 5, wherein updating stored weather hazard data comprises:

updating the stored weather hazard data for the second plurality of smaller areas based on the stored weather hazard data for the first plurality of smaller areas.

7. The method of claim 5, wherein transmitting the stored weather hazard data comprises:

transmitting the stored weather hazard data for the second plurality of smaller areas according to a first probability; and thereafter transmitting the stored weather hazard data for the first plurality of smaller areas according to a second probability.

8. The method of claim 1, wherein updating stored weather hazard data comprises:

determining current navigation data of the nodes;

determining a difference between the current navigation data and previously determined navigation data of the nodes;

updating the stored weather hazard data based on the difference.

9. The method of claim 1, wherein the given node only maintains the stored weather hazard data for a storage region of the given area, and wherein updating stored weather hazard data comprises:

deleting the stored weather hazard data for each of the plurality of smaller areas located outside of the storage region.

10. The method of claim 1, wherein updating stored weather hazard data comprises updating the stored weather hazard data for a given smaller area located within the detectable range based on the local weather hazard data for the given smaller area.

11. The method of claim 10, wherein updating the stored weather hazard data for a given smaller area located within the detectable range based on the local weather hazard data for the given smaller area comprises:

updating the stored weather hazard data for the given smaller area with the local weather hazard data for the given smaller area if the local weather hazard data for the given smaller area indicates a presence of a weather hazard occurrence.

12. The method of claim 1, wherein updating stored weather hazard data comprises updating the stored weather hazard data for a given smaller area based on the remote weather hazard data for the given smaller area.

13. The method of claim 12, wherein updating the stored weather hazard data for a given smaller area based on the remote weather hazard data for the given smaller area comprises:

updating the stored weather hazard data for the given smaller area with the remote weather hazard data for the given smaller area if the remote weather hazard data for the given smaller area indicates a presence of a weather hazard occurrence.

14. The method of claim 12, wherein updating the stored weather hazard data for a given smaller area based on the remote weather hazard data for the given smaller area comprises:

determining whether the stored weather hazard data for the given smaller area was previously updated based on local weather hazard data for the given smaller area; and updating the stored weather hazard data for the given smaller area with the remote weather hazard data for the given smaller area based on that determination.

15. The method of claim 12, wherein updating the stored weather hazard data for a given smaller area based on the remote weather hazard data for the given smaller area comprises:

determining whether the remote weather hazard data for the given smaller area is more recent that the stored weather hazard data for the given smaller area; and overwriting the stored weather hazard data for the given smaller area with the remote weather hazard data for the given smaller area based on that determination.

16. The method of claim 1, wherein updating stored weather hazard data comprises updating the stored weather hazard data for a given smaller area based on a reliability of the stored weather hazard data for the given smaller area.

17. The method of claim 16, wherein updating the stored weather hazard data for a given smaller area based on a reliability of the stored weather hazard data for the given smaller area comprises:

determining an amount of time since a last update of the stored weather hazard data for the given smaller area;

comparing the determined amount of time to a predetermined amount of time; and updating the stored weather hazard data for the given smaller area if the determined amount of time exceeds the predetermined amount of time.

18. The method of claim 1, further comprising:

ordering the stored weather hazard data for each of the plurality of smaller areas to correspond to an identity of each of the plurality of smaller areas.

19. The method of claim 1, wherein transmitting the stored weather hazard data comprises transmitting the stored weather hazard data for a given smaller area if the stored area weather hazard data indicates a presence of weather hazard occurrence for the given smaller area.

20. The method of claim 1, wherein transmitting the stored weather hazard data comprises transmitting the stored weather hazard data for a given smaller area if the given node has updated the stored weather hazard data for the given smaller area since the last transmission of the stored weather hazard data.

21. The method of claim 1, wherein transmitting the stored weather hazard data comprises defining a transmit region of the given area, wherein the transmit region includes a region behind the given node and a region ahead of the given node; and transmitting the stored weather hazard data for each of the plurality of smaller areas located within the transmit region.

22. The method of claim 1, further comprising:

determining current navigation data of the given node; and transmitting the current navigation data for receipt by the one or more other nodes.

23. The method of claim 1, further comprising:

providing a user of the given node with the stored weather hazard data.

* * * * *